May 10, 1932.   C. O. THOMAS   1,857,679
FLEXIBLE TRANSMISSION UNIT
Filed Dec. 12, 1929   2 Sheets-Sheet 1

Inventor
C. O. Thomas
By
Attorney

Inventor
C. O. Thomas

Patented May 10, 1932

1,857,679

UNITED STATES PATENT OFFICE

CECIL OLDRIEVE THOMAS, OF MONTREAL, QUEBEC, CANADA

FLEXIBLE TRANSMISSION UNIT

Application filed December 12, 1929. Serial No. 413,608.

My present invention relates to transmission units such as gears, sprockets, pulleys and such like of the type in which relatively rotatable rims, hereinafter called transmission members, and hubs are connected by cushioning devices to absorb shocks to which the transmission members or hubs may be subjected and, where two such units are mounted on the same shaft, to take up any misalignment of the teeth on said transmission members, and is in part a continuation of my former application, Ser. No. 198,172, filed the 11th June 1927.

In general, the objects of my invention are to provide a transmission unit of the character described, which provides means forming a driving connection between a shaft and a power transmission member, such as a gear, which will yield to a limited extent to overloads imposed upon it; to provide means which will absorb shocks incident to sudden changes in the load transmitted; to provide a yielding mounting for transmission members such as gears, which will take up back lash upon reversal of the direction of rotation or change of speed; and to provide a transmission member mounted as aforesaid, which will permit a slight oscillation of the transmission member on the shaft carrying it in the event of misalignment with the associated transmission member.

Broadly, the invention consists essentially of the novel design and structural features pointed out broadly and specifically in the claims for novelty following a description containing an explanation in detail of an acceptable embodiment of the invention.

Specifically, the invention comprises a male member having flaring substantially radial grooves in its outer periphery; an outer annular female transmission member encircling said male member having flaring substantially radial grooves in its inner periphery adapted to register with the aforesaid grooves; annular rings carried at the sides of said female member having opposed annular grooves registering with the ends of the aforesaid grooves; and a series of separate springs located in the said member grooves forming driving connection between the said members, each of the said springs comprising a pair of leaves normally curved from end to end and having end portions seated in the said annular grooves and engaging adjacent springs.

A specific object of my invention is to provide a highly efficient resilient mounting for a transmission member, such as a gear or pinion, adapted particularly for use in conjunction with gears or pinions or such like of small pitch diameter in relation to the diameter of the supporting shafts therefor.

Another specific object of my invention is to provide a transmission unit which affords no obstacles in machining according to current shop or manufacturing practice and which will accommodate for slight relative oscillation and eccentricity of the two major elements of the transmission unit.

In the accompanying drawings which illustrate various embodiments of the invention but to which embodiments and the details thereof the invention is not confined:—

Figure 2:
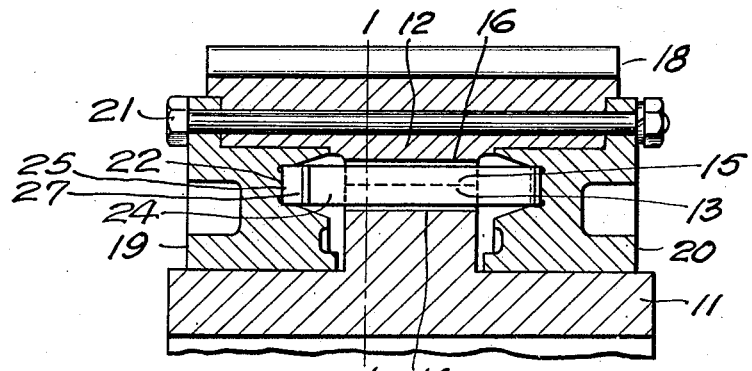
Fig. 2 is a half section of the device on the line 2—2 of Fig. 1.
Figure 3:
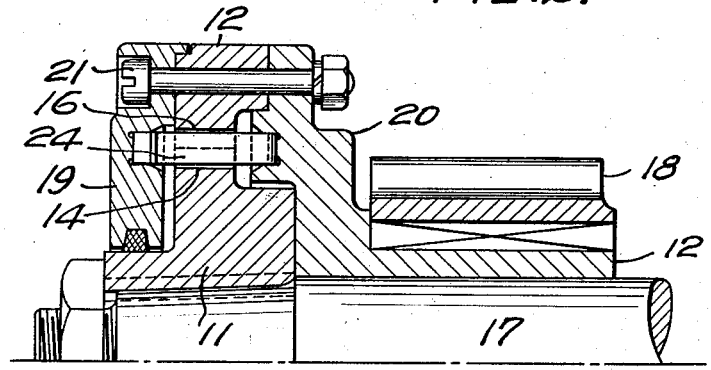
Figs. 3, 4 and 5 are half sections similar to Fig. 2 showing various modifications.
Figures 4, 5:
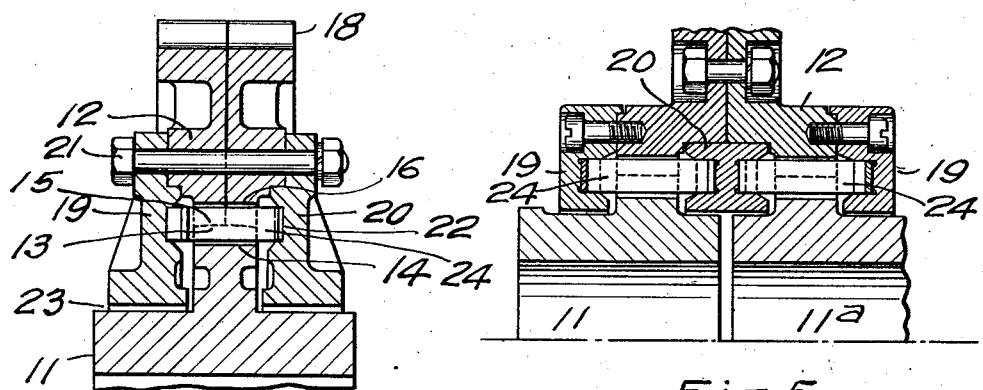

Referring more particularly to the drawings, 11 and 12 designate the coaxial made and female members respectively of the device, the male member having the outer surface 13 of its annular flange cut by a series of grooves 14 disposed parallel with the axis of the member and the female member having its inner cylindrical surface 15, which is in engagement with the outer surface 13 of the male member, cut by a series of grooves 16 disposed similarly to the male member grooves and mating therewith. The engagement of the surfaces 13 and 15 holds the members accurately centered with respect to one another. The outer surface 13 of the male member may be cylindrical, as shown in Figs. 2 and 3, or may be spherically curved from a centre in the axis of the member as shown in Fig. 4. The male member is preferably a sleeve rigidly secured to a shaft 17, as shown, but obviously may be formed integral with the shaft. The female member constitutes the power transmission member of the unit and may be in the form of a pinion, gear, sprocket, pulley or such like, either formed of a plurality of parts or in the form of an integral unit.

A pair of end rings 19 and 20 are provided, preferably rigidly attached to the female member by any suitable means, such as bolts 21. These rings cover the ends of the grooves 14 and 16 and are provided with circular grooves 22 facing the ends of the grooves. The rings 19 and 20 may be similar, as shown in Figs. 2 and 4, or may be slightly different in their outer formation, as shown in Figs. 3 and 5. In Fig. 3 the ring 19 encircles the male member while the ring 20 extends beyond the male member into engagement with the shaft 17 and is provided with an extension bearing on the shaft and having the gear 18 rigidly mounted thereon. In the forms shown in Figs. 2 and 3, when the engaging surfaces 13 and 15 of the male and female members are cylindrical and do not permit of any relative lateral oscillation of the male and female members, the rings preferably have bearing engagement with the male member or shaft, as the case may be; while in the form shown in Fig. 4, where the outer surface 13 of the male member is spherically curved to permit relative lateral oscillation of the male and female members, radial clearance 23 is provided between the rings and male member to permit the contemplated relative lateral oscillation.

Figure 1:
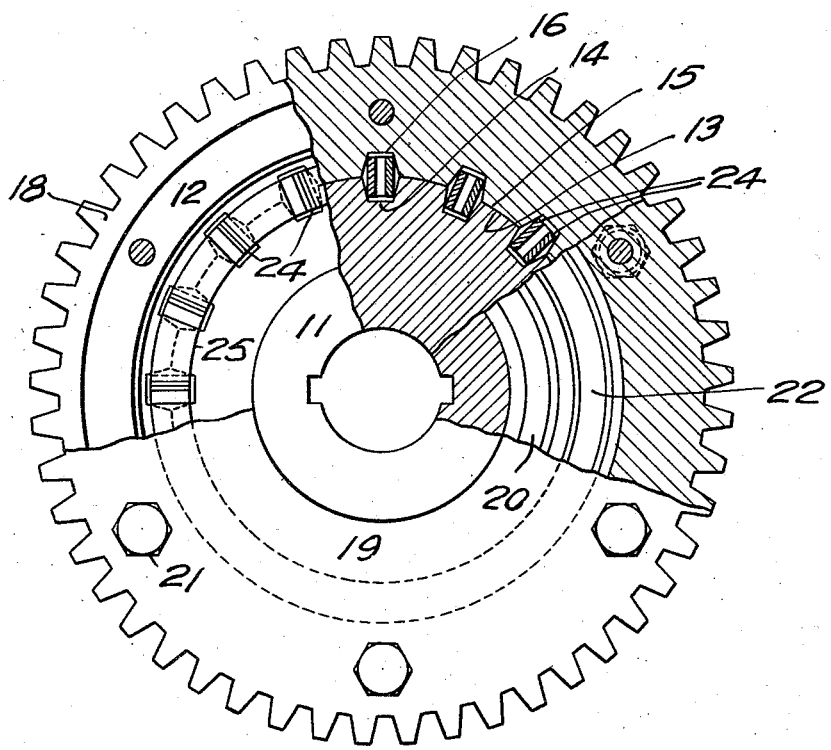
Fig. 1 is an end elevation of the device partly broken away to show the interior construction and partly in section on the line 1—1 of Fig. 2.
Figure 6:
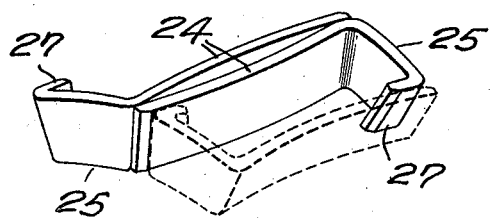
Fig. 6 is a perspective view of one form of spring connector.

The members are operatively connected by means of curved leaf springs 24 preferably arranged in pairs with their concave surfaces adjacent and their ends engaging, to constitute elliptical springs as shown in Fig. 6. The springs are so arranged that one longitudinal half of each leaf is engaged in the groove of one member and the other longitudinal half in the mating groove of the other member, whereby the springs are flexible in the circumferential direction of the members and normally engage the side walls of the grooves only at points intermediate the ends of the grooves. The springs are preferably considerably longer than the grooves, so that they project beyond the ends of the grooves. At least one end of each spring is preferably formed with a tail portion 25 extending approximately at right angles to the leaf and curved edgewise in conformity with the curvature of the ring grooves 22, in which the spring tails engage with a snug working fit. The free end of each tail 25 may have an inturned lip 27. The lengths of the tails are so proportioned to the circumferential distance between adjacent grooves 14 and 16 that when the springs are in position the tail of each spring will engage the adjacent spring, so that the springs will constitute force transmitting system to equalize the inequalities in load upon or resistance of the springs. When inserted in the grooves the springs are sufficiently flexed to retain contact with the groove walls.

The arrangement of Figs. 2 and 4 is that suitable for ordinary gearing, while the arrangement of Fig. 3 is that suitable where the size of a pinion will not permit location of the driving means within the pinion. The arrangement of Fig. 5 is that suitable where additional cushioning is required and consists in the provision of two male members 11 and 11$^a$ and a female member 12 common to both. In this arrangement the gear or like member may be connected either to the second male member 11$^a$ which will then be loose on the shaft or to the female member.

The operation is as follows:—

The springs constitute a yielding driving connection between the male and female members. When at rest the springs hold the grooves 14 in register with the grooves 16. Upon application of rotative force to either member, the rear walls of the grooves of that member press against the springs they engage, that is, every second spring, and urge these springs to bodily movement, which urge these springs transmit to the remaining springs which in turn transmit the urge to the front walls of the grooves of the other member. The springs are or tend to be all equally flexed with straightening tendency, the sum of the resistances of the springs equalling the inertia of the driven member so that the member is set in rotation. If the inertia or load is sufficient to cause flexion of the springs there is a slight relative rotation of the male and female members. Thus, upon starting or stopping or change of load during rotation, the springs are flexed or tend to be flexed or to reflex to transmit the change of load gradually from member to member and thus to avoid sudden shocks. In the case of sudden release of load or of reversal, where the driven gear tends to run ahead of the driving gear, the springs take up the back lash of the gears and prevent shock and noise. The springs can be compressed to flatness and in this condition form a solid unyielding drive between the male and female members and will transmit any force up to the shearing resistance of the springs. The shearing tendency imposes a torsional stress in the springs owing to their being held at the ends by engagement of their tails in the ring grooves and this torsional stress may be availed of to impart additional resiliency to the device if the walls of the grooves 14 and 16 are slightly flared from bottom to top as shown. Moreover, the frictional engagement of the springs in the grooves 22 serves to damp out recoil upon sudden changes of load.

If the male member is spherically surfaced, as shown in Fig. 4, and clearance 23 provided between the rings 19 and 20 and the male member, it permits the female member and gear carried thereby to oscillate laterally or "wobble" on the shaft, if it should happen to be slightly out of axial alignment with the gear with which it meshes, and thus enable it to follow the meshing gear and avoid end slip of the teeth and consequent wear. The internal surface of the female member may be cylindrical, as shown in Figures 2 and 3 or spherically curved as shown in Figure 4, the latter arrangement affording a more stable and enduring support for the gear. The spherically surfaced female member is assembled around the male member by reason of being split in a plane perpendicular to its axis as shown.

Details of construction and operation not herein described may be ascertained from the former application hereinbefore referred to.

Having thus described my invention, what I claim is:—

1. In a transmission unit, in combination, an annular female trasmission member having substantially radial grooves in its inner periphery; a male member bearing in said female member and having substantially radial grooves in its outer periphery registering with said grooves in said female member; and a series of elliptical leaf springs arranged lengthwise in said grooves.

2. In a transmission unit, in combination, a male member and an outer female transmission member presenting substantially concentric contiguous surfaces provided with mating grooves disposed parallel with the axis of the members, and a series of leaf springs normally curved from end to end and in the axial direction of the said members, each arranged with approximately one longitudinal half located in a mating groove, of one said member and the other approximately longitudinal half located in a mating groove of the other said member and adapted to be flexed with flattening tendency upon relative angular movement of the said members.

3. In a transmission unit, in combination, a male member and an outer female transmission member presenting substantially concentric outer and inner contiguous surfaces provided with mating grooves disposed parallel with the axis of said members, and a series of elliptical springs disposed in the said grooves and each spring normally contacting only at its central portion with the sides of the grooves.

4. In a transmission unit, in combination, an annular female transmission member and an inner male member having concentrically related surfaces provided with mating grooves parallel with the axis of the said members, said female member carrying two annularly grooved portions, and a series of leaf springs mounted at their ends in the said annularly grooved portions of said female member and disposed intermediate their ends in said mating grooves of said male and female members.

5. In a transmission unit in combination, a male member including a flange having the edge thereof provided with a series of grooves parallel with the member axis, an annular female transmission member encircling and shrouding the grooved portion of the male member flange, said female member presenting an internally grooved surface, the grooves of which mate with the grooves of the said male member, said female member being further provided with a pair of annular grooves disposed one on either side of the said male member flange, and a series of springs located at their ends in said annular grooves and located at their intermediate portions in the mating grooves of the said male and female members.

6. In a transmission unit, in combination, an annular female trasmission member having substantially radial grooves in its inner periphery; a male member in said female member and having substantially radial grooves in its outer periphery registering with said grooves in said female member; members carried by said female member having annular grooves in opposed relation at the sides of said male member and registering with the ends of the aforesaid radial grooves in said male and female members; and springs located at their ends in said annular grooves and extending through said radial grooves.

7. In a transmission unit, in combination, an annular female transmission member having substantially radial grooves in its inner periphery; a male member in said female member having substantially radial grooves in its outer periphery registering with said grooves in said female member; a pair of annular rings carried by said female member having annular grooves formed therein in opposed relation and registering with the ends of the said radial grooves; and springs located at their ends in said annular grooves and extending through said radial grooves.

8. In a transmission unit, in combination, an annular female transmission member having substantially radial grooves in its inner periphery; a male member in said female member having substantially radial grooves in its outer periphery registering with said grooves in said female member; a pair of annular rings carried by said female member having annular grooves formed therein in opposed relation and registering with the ends of the said radial grooves; and springs located at their ends in said annular grooves and extending lengthwise through said radial grooves.

9. In a transmission unit, in combination, an annular female transmission member having substantially radial grooves in its inner periphery; a male member in said female member having substantially radial grooves in its outer periphery registering with said grooves in said female member; a pair of annular rings carried by said female member having annular grooves formed therein in opposed relation and registering with the ends of the said radial grooves; and springs located at their intermediate portions in said radial grooves and including tail portions located in said annular grooves.

10. In a transmission unit, in combination, an annular female transmission member and an inner male member presenting substantially concentric adjacent surfaces formed with a plurality of mating grooves; a series of springs located in said mating grooves in position to be partially rotated about their longitudinal axes upon relative angular movement of said female and male members; and means holding said springs at their ends against rotation, whereby upon tendency to relative angular movement of the said female and male members the said springs are subjected to torsional stress.

11. In a transmission unit, in combination, a male member and an outer female transmission member presenting substantially concentric adjacent surfaces formed with mating grooves therein; and a series of springs located in said mating grooves in position to be partially rotated about their longitudinal axes upon relative angular movement of said members, said springs including tails engaged by holding means therefor carried by one of said members to hold said springs against rotation at their ends, whereby upon relative angular movement of the said members the springs are subjected to torsional stress.

12. In a transmission unit, in combination, a male member and an outer female transmission member presenting substantially concentric adjacent surfaces formed with mating grooves therein; and a series of spring located in said mating grooves, said mating grooves being formed to permit partial rotation of said springs about their longitudinal axes upon relative angular movement of said members, said springs being engaged by holding means therefor carried by one of said members to hold said springs against rotation at their ends, whereby upon relative angular movement of the said members the springs are subjected to torsional stress.

13. In a transmission unit, in combination, a male member and an outer female transmision member presenting substantially concentric adjacent surfaces formed with mating grooves therein; and a series of springs located in said mating grooves, said mating grooves being formed to permit partial rotation of said springs about their longitudinal axes upon relative angular movement of said members, said springs including portions engaged by holding means therefor carried by one of said members to hold said springs against rotation at their ends, whereby upon relative angular movement of the said members the springs are subjected to torsional stress.

14. In a transmission unit, in combination, a male member and an outer female transmision member presenting substantially concentric adjacent surfaces formed with mating grooves therein substantially parallel with the axis of said members; a pair of annular rings carried by said female member having annular grooves formed therein in opposed relation and registering with the ends of said mating grooves; and springs of strip form located in said mating grooves and tending to be rotated about their longitudinal axes upon the relative angular movement of said members, and having portions extending into said annular grooves to resist rotation of said spring members, whereby upon relative angular movement of said members the springs are subjected to torsional stress.

15. In a transmission unit, in combination, an outer transmission member in the form of a ring having substantially radial grooves in its inner periphery, an inner member having substantially radial grooves in its outer periphery registering with said grooves in said outer member, the inside diameter of the outer member and the outside diameter of the inner member being approximately equal, one of said members being formed adjacent the ends of said radial grooves with an annular groove, a plurality of normally curved leaf springs located in said radial grooves adapted to be flexed with straightening effect upon relative angular movement of said members and to simultaneously have imparted thereto a tendency to rotation about their longitudinal axes, and portions of said spring members seated in said annular groove and resisting the tendency to rotation, whereby the spring members are also subjected to torsional stress.

16. In a transmission unit, in combination, a male member and an outer female transmission member presenting substantially concentric adjacent surfaces formed with mating grooves, the side walls of said grooves diverging slightly from the bottoms to the tops of the said grooves, and springs of strip form located in the said grooves and normally bearing against the side walls of the said grooves adjacent the bottoms thereof, said springs operating to resist relative angular movement of said members and tending to be rotated about their longitudinal axes by tendency to relative angular movement of said members, thereby to shift the points of engagement of the spring members and groove walls toward the tops of said grooves.

17. In a transmission unit, in combination, a male member and an outer female transmission member having normally concentric surfaces formed with mating grooves having the side walls thereof slightly flared from bottom to top, and springs normally curved from end to end and located lengthwise in the said mating grooves and forming driving connection between the said members, said springs normally engaging said mating groove side walls near the bottoms thereof only and being normally spaced from said mating groove walls at the tops thereof, whereby relative rotation of the said members tends to cause each said spring to rotate about its own axis.

18. In a transmission unit, in combination, a male member and an outer female transmission member having normally concentric surfaces formed with mating grooves, and springs normally curved from end to end and located lengthwise within said mating grooves and forming yielding driving connection between the said members, the grooved surfaces of the members being spaced to induce rotation of the said springs about axes parallel with the axis of the said members and the walls of said mating grooves being flared from the bottom to top to afford surface engagement for the said springs upon rotation thereof and to reduce the rotating force applied to the said springs, and means holding the said springs at their ends against rotation whereby the springs are subjected to torsional stress.

19. In a transmission unit, in combination, a male member and an outer female transmission member having normally concentric surfaces formed with mating grooves substantially parallel with the axis of said members, and a series of separate springs located in said grooves and forming driving connections between the said members, each of said springs comprising a pair of leaves normally curved from end to end and a pair of laterally and oppositely extending tail portions engaging adjacent springs for equalization of load.

20. In a transmission unit, in combination, a male member having flaring substantially radial grooves in its outer periphery; an outer annular female transmission member encircling said male member having flaring substantially radial grooves in its inner periphery adapted to register with the aforesaid grooves; annular rings carried at the sides of said female member having opposed annular grooves registering with the ends of the aforesaid grooves; and a series of separate springs located in the said member grooves forming driving connection between the said members, each of the said springs comprising a pair of leaves normally curved from end to end and having end portions seated in the said annular grooves and engaging adjacent springs.

In witness whereof, I have hereunto set my hand.

CECIL OLDRIEVE THOMAS.